United States Patent [19]

Rippel

[11] Patent Number: 4,920,475

[45] Date of Patent: Apr. 24, 1990

[54] INTEGRATED TRACTION INVERTER AND BATTERY CHARGER APPARATUS

[75] Inventor: Wally E. Rippel, Altadena, Calif.

[73] Assignee: California Institute of Technology, Pasadena, Calif.

[21] Appl. No.: 164,868

[22] Filed: Mar. 7, 1988

[51] Int. Cl.$^5$ ............................................. H02M 7/537
[52] U.S. Cl. ..................................... 363/132; 363/137; 320/5; 320/57
[58] Field of Search ............... 363/132, 133, 134, 136, 363/137; 320/5, 13, 57; 307/10 R

[56] References Cited

U.S. PATENT DOCUMENTS

| | | | |
|---|---|---|---|
| 3,348,060 | 10/1967 | Jamieson. | |
| 3,950,689 | 4/1976 | Jamieson | 320/5 |
| 4,039,926 | 8/1977 | Steigerwald | 363/138 |
| 4,065,711 | 12/1977 | Kawabata | 320/59 |
| 4,136,382 | 1/1979 | Ricci | 363/137 |
| 4,186,437 | 1/1980 | Cuk | 363/65 |
| 4,258,304 | 3/1981 | Bourke | 320/59 |
| 4,272,716 | 6/1981 | Etienne | 320/59 |
| 4,314,191 | 2/1982 | Kawada et al. | 318/802 |
| 4,333,042 | 6/1982 | Kawabata et al. | 318/811 |
| 4,377,779 | 3/1983 | Plunkett | 363/41 |
| 4,408,268 | 10/1983 | Peters et al. | 363/62 |
| 4,466,052 | 8/1984 | Thrap | 363/41 |
| 4,491,778 | 1/1985 | Knox et al. | 318/803 |
| 4,672,520 | 6/1987 | Ueda et al. | 363/137 |
| 4,673,825 | 6/1987 | Raddi et al. | 307/66 |

OTHER PUBLICATIONS

"Solid State Devices for Induction Motor: Early Technology to Current Research", Farhad Barzegar & Slobodacuk 1982.
"A New High-Quality PWM AC Drive", Grant, Duncan A. et al., IEEE, pp. 211-216, Mar./Apr. 1983.

Primary Examiner—Patrick R. Salce
Assistant Examiner—Kristine Peckman
Attorney, Agent, or Firm—Marvin E. Jacobs

[57] ABSTRACT

An integrated traction inverter and battery charger apparatus which is capable of operating in either drive or charge modes. The apparatus integrates the components of a prior art three-phase inverter with an AC line-powered prior art DC source charger in a manner which recognizes that an input capacitor and certain components of a three-phase bridge inverter are capable of performing dual functions and thus can be active in both modes. Therefore, in the integration of the prior art devices some of the components are eliminated allowing savings in cost and weight of, and space required by, the components of the integrated inverter/charger apparatus.

7 Claims, 3 Drawing Sheets

4,920,475

INTEGRATED TRACTION INVERTER AND BATTERY CHARGER APPARATUS

ORIGIN OF INVENTION

The invention described herein was made in the performance of work under a NASA contract, and is subject to the provisions of Public Law 96-517 (35 USC 202) in which the Contractor has elected to retain title.

BACKGROUND OF THE INVENTION

The present invention relates generally to power and drive systems employing a three-phase bridge inverter operated by a rechargable DC source to supply AC power to operate a polyphase load. More particularly, the invention is concerned with an integrated traction inverter and battery charger apparatus capable of operating in either a drive mode to operate the polyphase load or a charge mode to recharge the DC source.

Compared to a DC brush-type motor, it is more advantageous to use a three-phase motor (e.g., induction, DC brushless and switched reluctance) in many applications, such as electrically powered vehicles, load leveling systems, standby AC power systems and uninterruptible power systems. While the DC brush-type motor is simpler to supply with power for operation, its construction has drawbacks. This DC motor has a mechanical commutator and brushes which contact while moving relative to one another. Thus, these components are subject to wear and must be given periodic maintenance.

These drawbacks are eliminated in the construction of a three-phase motor. It has a simplier, brushless construction and therefore is highly reliable and requires relatively low maintenance. For these reasons it can be operated at higher speeds than a brush-type motor and hence has increased power to volume and weight ratio.

These advantages make the three-phase brushless motor more attractive than the brush-type motor even though the brushless motor requires a more complex device to supply power to it from a DC battery. Whereas the brush-type motor requires a relatively simple DC-to-DC converter to power it, the three-phase brushless motor requires a relatively more complex three-phase bridge inverter to generate the rotating magnetic field which operates the motor.

Notwithstanding the advantages of using a three-phase motor for many applications, in vehicular traction drive systems the complexity it adds raises other problems. Typically, both the DC battery operated three-phase bridge inverter and a single-phase boost-regulated battery charger are mounted onboard the vehicle with the AC traction motor. The complexity of these components oftentimes makes it difficult to minimize or reduce their weight and the space they take up on the vehicle which correspondingly affects adversely the overall performance and desirability of the drive system employing the three-phase motor. Consequently, a need exists for improvements which will alleviate these problems.

SUMMARY OF THE INVENTION

The present invention provides an integrated traction inverter and battery charger apparatus designed to satisfy the aforementioned needs. Underlying the present invention is the recognition that a conventional traction-motor inverter and a conventional battery charger can be integrated so as to eliminate many components thereof, thereby saving room, reducing vehicular weight and cost, and improving system reliability. Specifically, it is recognized that both devices use many of the same components and, in view that in vehicular operations charging is performed when the traction-motor inverter is idle and vice versa, dual use of these same components is feasible. Dual use could be effected by reconnecting and rearranging components of these devices by using switches and relays; however, these devices would increase cost and physical volume, and reduce reliability and useful life. The optimum approach recognized by the present invention is to use the three-phase bridge inverter either in a drive mode to operate a polyphase load such as the AC traction motor or in a charge mode as a regulated battery charger, without circuit disconnects and with the minimum of additional components. Specifically, the elements contained within one phase pole of the inverter are used to operate it as the boost-regulated battery charger.

Therefore, the present invention provides an integrated traction motor inverter and battery charger apparatus capable of operating in either drive or charge modes without switches or other disconnects. The integrated apparatus includes a three-phase bridge inverter employing pulse-width-modulation (PWM), an input capacitor, a line filter, a line rectifier, and control circuitry. The inverter can be controlled to operate a polyphase load such as an AC traction motor driver or as a unity power-factor single-phase boost-regulated battery charger.

These and other advantages and attainments of the present invention will become apparent to those skilled in the art upon a reading of the following detailed description when taken in conjunction with the drawings wherein there is show and described an illustrative embodiment of the present invention.

BRIEF DESCRIPTION OF THE DRAWINGS

In the course of the following detailed description, reference will be made to the attached drawings in which.

DETAILED DESCRIPTION OF THE INVENTION

Figure 1:
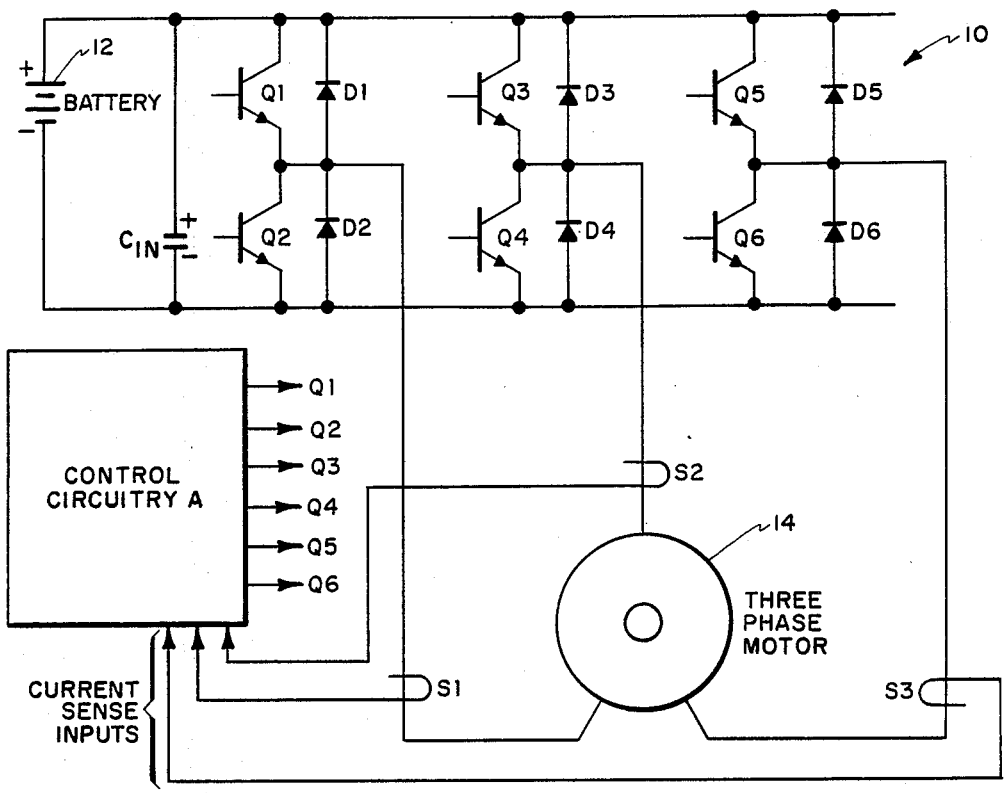
FIG. 1 is a schematic circuit diagram of a conventional voltage-fed PWM-controlled inverter connected to a three-phase motor and a DC battery.

Referring to drawings, and first particularly to FIG. 1, there is shown a simplified power-circuit schematic of a voltage-fed three-phase bridge inverter 10 of the prior art operated by a DC battery 12 and controlled by a PWM control circuitry A for driving a three-phase traction motor 14. Details of the control circuitry A are not shown.

The prior art bridge inverter 10 includes a plurality of semiconductor switch elements, by way of example in the form of transistors Q1-Q6 and a plurality of diodes D1-D6 which correspond to the transistors. Corresponding outputs of the control circuitry A are connected to the gates of the semiconductor switches Q1-Q6, whereas inputs of the control circuitry include various control signals (not shown) as well as signals received from current sensors S1-S3 coupled to the three conductor lines leading from the junctions between pairs of switches Q1/Q2, Q3/Q4 and Q5/Q6 and correspondingly paired diodes to the three-phase motor 14. Through appropriate switching of the semiconductor devices Q1-Q6 in the bridge inverter 10 as controlled by circuitry A, three-phase voltage and current waveforms of appropriate magnitude and frequency are applied to the motor 14 to create the required rotating magnetic field to operate the motor. Regenerative and reactive currents are returned to an input capacitor C(IN) and to the battery 12, by the six anti-parallel diodes D1-D6. The input capacitor C(IN) isolates AC components from the battery 12, acting as an elemental filter having a much lower impedance to transients than does the battery.

Figure 2:
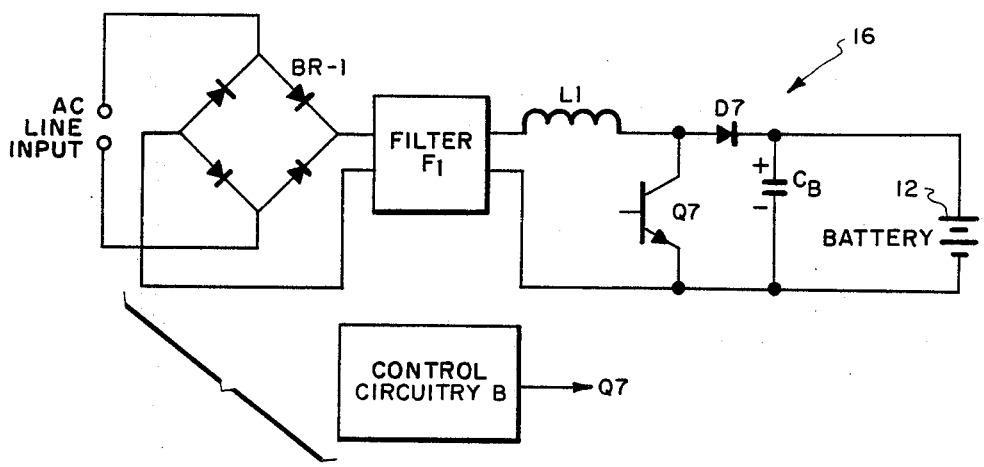
FIG. 2 is a schematic circuit diagram of a conventional boost-regulated battery charger.

Turning now to FIG. 2, there is seen a schematic circuit diagram showing the essential power components of a single-phase boost-regulated battery charger 16 of the prior art. The prior art battery charger 16 is of a type useful in recharging a DC battery, such as the same battery 12 as in FIG. 1, employed, for instance, in a vehicular traction drive system. The battery charger 16 includes a rectifier bridge BR-1, a filter F1, a boost inductor L1, a power switch in the form of transistor Q7, a blocking diode D7, and its isolating capacitor C(B). A PWM control circuitry B is provided to control the switching of a semiconductor power switch as exemplified by the transistor Q7.

Through appropriate duty-cycle modulation of the power switch Q7 as controlled by the PWM circuitry B, power is transferred from the AC line input, through the rectifier bridge BR-1, filter F1, boost inductor L1, and blocking diode D7 to the DC battery 12 and its isolating capacitor C(B). The filter F1 can be placed on either side of the rectifier bridge BR-1. The instantaneous line current is maintained proportional to the instantaneous line voltage (unity power factor condition). The capacitor C(B) isolates high frequency AC components from the DC battery 12, as discussed above. The filter F1 isolates high frequency AC components from the AC line input.

Figure 3:
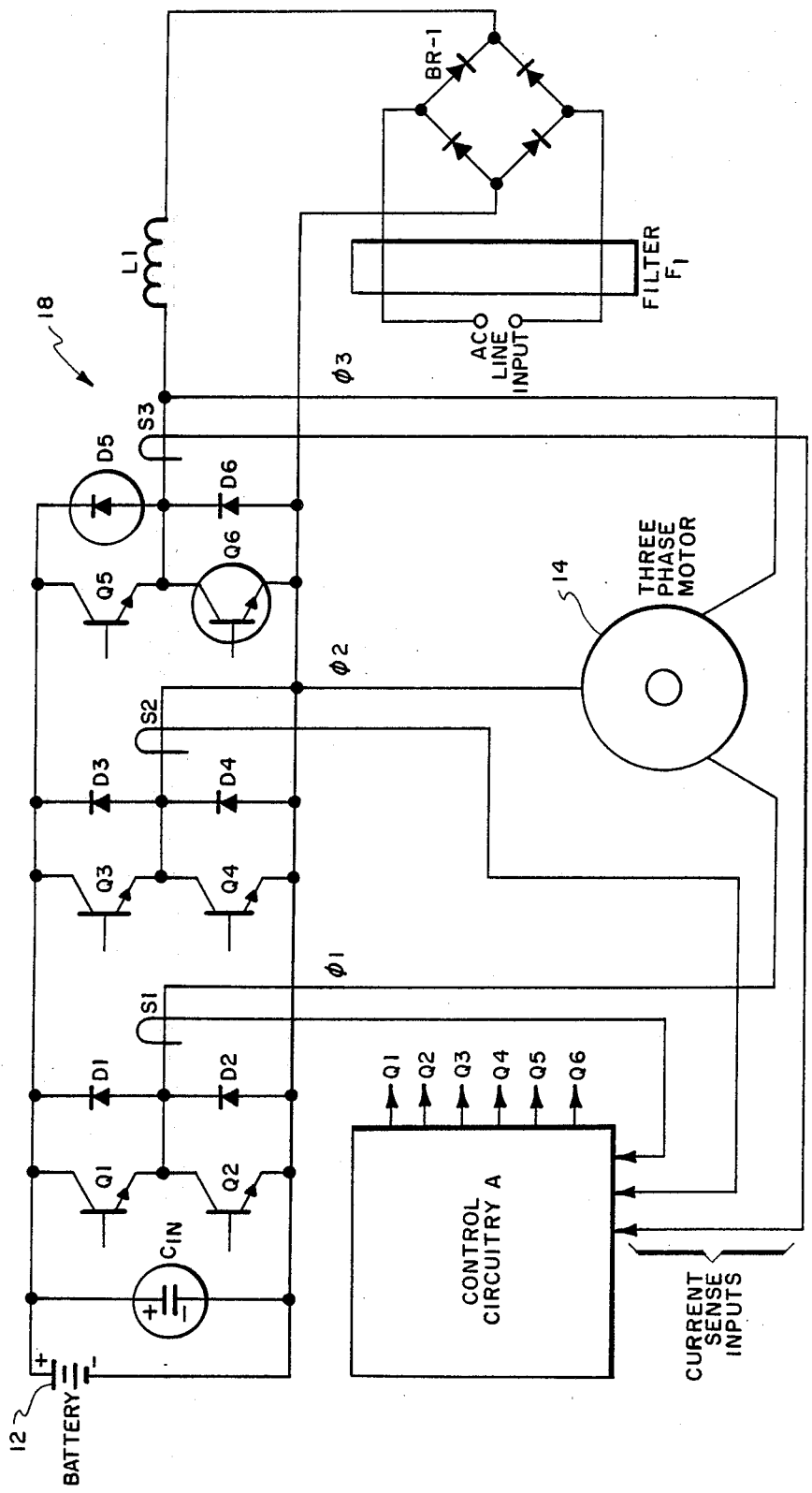
Fig. 3 is a schematic circuit diagram of an integrated inverter and boost-regulated charger apparatus constructed in accordance with the principles of the present invention.

Underlying the origination of the integrated traction inverter and battery charger apparatus, generally designated 18 in FIG. 3 and constituting one embodiment of the present invention, is the recognition by the inventor herein that the capacitors C(IN) and C(B) in the circuits of the respective prior art inverter 10 and prior art battery charger 16 are equivalently placed, that is, across the DC battery 12, and perform identical functions. In like manner, power switch Q7 in the prior art battery charger 16 was seen by the inventor herein to have its equivalent in power switch Q6 in the prior art inverter 10. Further, respective diodes D7 and D5 were observed by the inventor herein to be equivalently placed in their respective circuits. Also, as perceived by the inventor herein PWM control circuits A and B are generally equivalently placed so that control circuit A can be modified to perform both sets of functions. Thus, the inventor herein recognized that an integrated inverter/charger capable of operating in dual modes and performing the dual functions of motor driving and battery charging could be built from a single set of components comprised chiefly of those already in existence in the separate prior art inverter 10 and prior art charger 16, with elimination of those components that are duplicates — capacitor C(B), diode D7 and transistor Q7 of the battery charger 16 — of other components already provided in the inverter 10 and therefore not needed.

The end result of the above-described perceptions on the part of the inventor herein is the integrated inverter/charger apparatus 18 of FIG. 3, with the AC input line to the right in the figure and the filter F1 now placed on the AC line side of the rectifier bridge BR-1. The integrated apparatus 18 is capable of operating in either drive or charge modes without the addition of switches or other disconnects, except for the mere switching on or plugging of the apparatus 18 into the AC feed line when the AC motor 14 is not in use and it is desired to operate the apparatus in its charge mode to recharge the DC battery 12. It is not necessary to disconnect the motor 14 during charge, or recharge, mode since all three-phases are free to maintain some instantaneous potentials and, therefore, no currents flow in the motor except for small amounts due to winding capacitance to ground. Further, note that with filter F1 on the AC line side of the rectifier bridge BR-1, current flow to the filter F1 during the drive mode is prevented by the diodes in the rectifier bridge BR-1 which are back biased.

In its basic components as seen in FIG. 3, the integrated inverter/charger apparatus 18 now includes the three-phase bridge inverter 10 having the semiconductor switches Q1-Q6 and diodes D1-D6 as before, the PWM control circuitry A having current sensors S1-S3 as before and now adapted to control switching of the switches Q1-Q6 of the inverter 10 for operating the inverter in either mode, the input capacitor C(IN), the boost inductor L1, the line rectifier BR-1 and the line filter F1. The functioning of these respective components in their normal ways to drive the three-phase motor 14 and to recharge the DC battery 12 need not be described again since such is substantially the same as before (except for the interchanging of the positions of the line rectifier and line filter as pointed out previously). Only the manner in which certain of the components now perform a dual role will be described below.

During the drive mode of the integrated apparatus 10 when the three-phase bridge inverter 10 is operating the three-phase motor 14 in the conventional manner, the AC input line is disconnected from the integrated apparatus 10. Accordingly, the parallel portion of the circuit of the integrated apparatus 10 containing the boost inductor L1, the line rectifier BR-1 and the line filter F1 is open and these components are inactive.

For initiating the charge mode of the integrated apparatus 10 when the three-phase bridge inverter 10 is idled by the control circuitry A so as not to operate the three-phase motor 14, the AC input line is then reconnected to the integrated apparatus 10. By controlling only switch Q6 with the appropriate PWM duty cycle, the desired recharge power flow can be effected, and instantaneous line currents can be maintained proportionate to line voltage, thus achieving unity power factor operation. Diode D5 now acts as the boost regulator diode. The control circuitry A and current sensor S3 act to control charging in the conventional manner. During the charge mode, all other power switches Q1-Q5 are maintained off at all times by the control circuitry A. Thus, no motor currents flow despite the presence of voltage on the junction of D5 and Q6, for there are no return paths present. Thus, it is not necessary to disconnect the AC motor 14 during recharge. The circles around the switch Q6, diode D5 and capacitor C(IN) point out that these components are the active ones in the inverter 10 during the charge mode of the integrated apparatus 18.

It should be readily apparent that the above-noted elimination of some of the components of the prior art charger 16 resulting from the integration of the prior art inverter 10 and charger 16 into the integrated apparatus 18 achieves savings in terms of cost, weight and space. Also, costs, weight and space are further saved by the dual mode use of the following additional components and structures: a battery connector plug, bus connections, heatsinking structures, a cooling fan, and housing and mechanical support elements.

Potentially the inductance that already exists in the interwinding leakage inductance of the three-phase motor 14 can be used to replace the boost inductor L1 for a further savings by elimination of this component. Of course, for low charge currents, (in comparison to full motor current ratings) the relatively low value of the leakage inductance will allow relatively high ripple currents to exist, and the use of this scheme would probably not be warranted. However, for high charge rates the ripple currents become acceptable. In vehicular use, a fast charge would be desired by many users.

Figure 4:
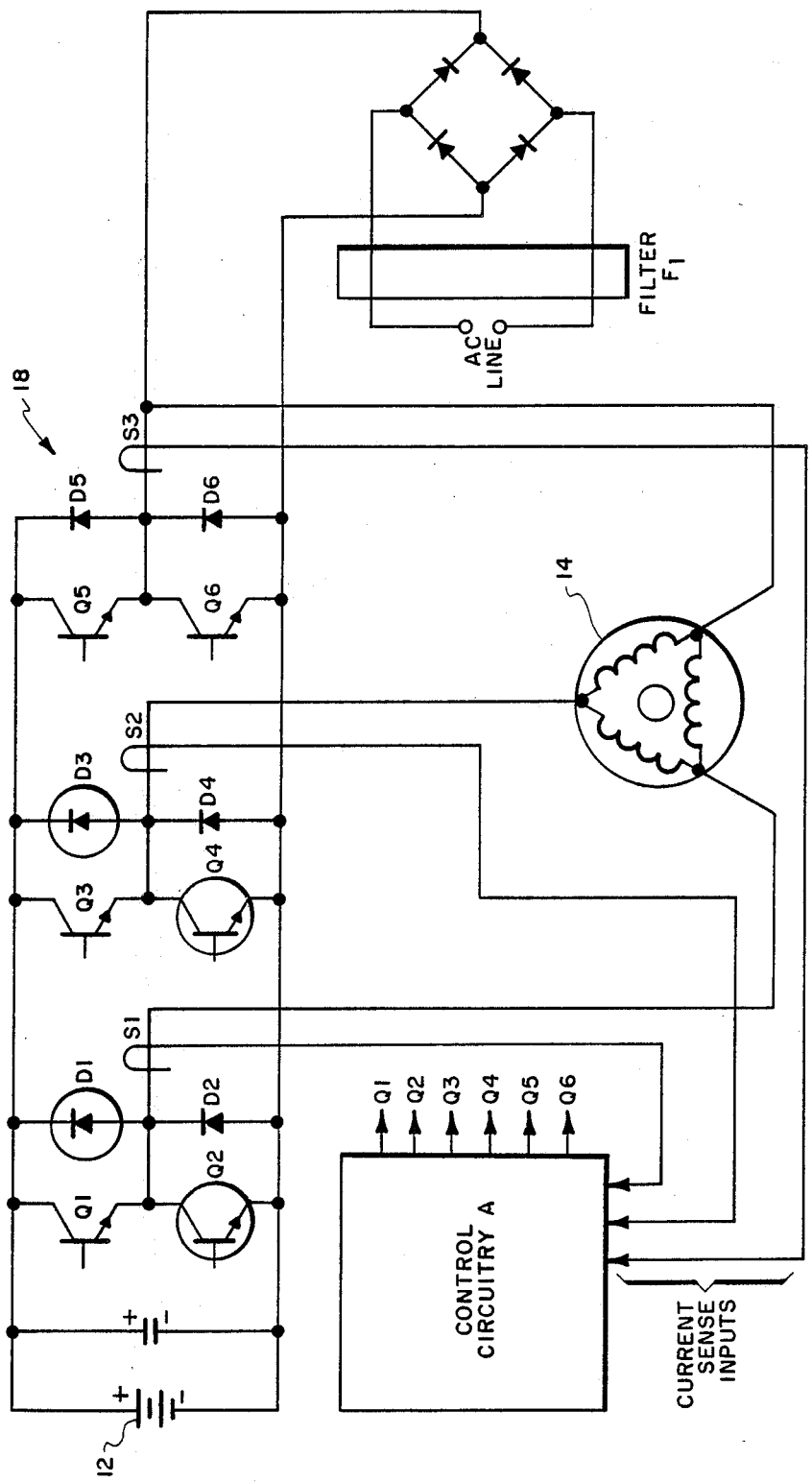
FIG. 4 is a schematic circuit diagram of a modified version of the integrated invertor and boost-regulated charger apparatus of the present invention wherein motor leakage inductance is employed in place of an inductor as in FIG. 3.

FIG. 4 illustrates a modified version of the integrated inverter/charger apparatus wherein the boost inductor L1 has been eliminated. In the charge mode, operation is accomplished by providing a return path for motor current by PWM activation via control circuitry A of either switch Q2 or switch Q4, with corresponding diodes D1 or D3 involved. The circles in FIG. 4 indicate the active components. Current sensors S1 or S2 would be employed also. Furthermore, with simultaneous control of both power switches Q2 and Q3 with "interlaced" duty cycles, charging power can be increased further while harmonic currents at filter F1 and capacitor C(IN) are reduced.

Whereas a DC battery and a three-phase motor are illustrated in the drawings, these are by way of example only. Other DC sources, such as flywheel generators and regenerative fuel cells, can be substituted for the DC battery. Also, other polyphase loads, such as a DC brushless motor or a polyphase transformer connected to a utility line, can be substituted for the three-phase motor.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. An integrated inverter/charger apparatus, comprising:
   a polyphase bridge inverter adapted to be connected to a polyphase load said inverter including a plurality of switch elements and current path blocking elements;
   an input capacitor, said capacitor and inverter adapted to be connected in parallel across a DC source;
   a rectifier having an input and an output connected at its input to an AC input line;
   inductor means connected between said inverter and said output of the rectifier; and
   control circuitry coupled to said inverter and being adapted to control the invertor in either a drive mode wherein, with the AC input line being disconnected from said input of the rectifier and with said inverter being connected to the polyphase load, said inverter is rendered active by said control circuitry so as to be operated by the DC source to drive the polyphase load or a charge mode wherein, with the AC input line being connected to said input of the rectifier and with said inverter remaining connected to the polyphase load, only a portion of said inverter is rendered active by said control circuitry so as to connect the DC source and input capacitor with said inductor means and rectifier and to be operated by the AC input line to charge the DC source.

2. The integrated apparatus of claim 1 wherein said control circuitry being coupled to said inverter is adapted to control the inverter in either said drive mode wherein at various times all of said switch and current blocking elements of said inverter are active causing said inverter to be operated by the DC source to drive the polyphase load or said charge mode wherein some but not all of said switch and current blocking elements of said inverter are active to connect the DC source and input capacitor with said inductor means and rectifier and to be operated by the AC input line for charging the DC source.

3. The integrated apparatus of claim 1 wherein said inverter includes a plurality of output leads adapted to connect pairs of said switch elements and current path blocking elements to the polyphase load.

4. The integrated apparatus of claim 1 wherein said inductor means is an inductor winding connected between said inverter and said output of the rectifier.

5. The integrated apparatus of claim 1 wherein said inductor means is windings of the polyphase load which are connected to said inverter in both said drive and charge modes.

6. The integrated apparatus of claim 1 wherein said control circuitry employs a pulse-width-modulation type of control.

7. An integrated inverter/charger apparatus, comprising:
   a polyphase bridge inverter having a plurality of switch elements and current path blocking elements and a plurality of output leads adapted to be connected to a polyphase load;
   an input capacitor, said capacitor and inverter adapted to be connected in parallel across a DC source;
   rectifier having an input connected to an AC input line and an output;
   an inductor connected between said inverter and said output of the rectifier; and
   control circuitry coupled to said switch elements of said inverter and being adapted to control the inverter in either a drive mode wherein, with the AC input line being disconnected from said rectifier and with said output leads of said inverter being connected to the polyphase load, at various times all of said switch and current blocking elements of said inverter are rendered active by said control circuitry so as to be operated by the DC source to drive the polyphase load or a charge mode wherein, with the AC input line being connected to said rectifier and with said output leads of said inverter remaining connected to the polyphase load, some but not all of said switch and current blocking elements of said inverter are rendered active by said control circuitry so as to connect the DC source and input capacitor with said inductor and rectifier and to be operated by the AC input line to charge the DC source.

* * * * *